United States Patent [19]

Moller

[11] 4,002,248
[45] Jan. 11, 1977

[54] MULTI-STAGE PIPE FEEDER

[76] Inventor: Walter H. Moller, 14834 NE. 11th Place, Bellevue, Wash. 98007

[22] Filed: Aug. 28, 1975

[21] Appl. No.: 608,765

[52] U.S. Cl. .................................. 214/1 P; 214/2.5
[51] Int. Cl.² ........................................ E21B 19/14
[58] Field of Search ............... 214/1 P, 1 PA, 1 PB, 214/1.5, 1.3, 2.5, DIG. 3, DIG. 4; 175/85, 52

[56] References Cited

UNITED STATES PATENTS

| | | | |
|---|---|---|---|
| 2,166,609 | 7/1939 | Putnam | 214/1 P |
| 2,194,125 | 3/1940 | Rinehart | 214/DIG. 3 |
| 2,692,565 | 10/1954 | Cummings | 214/1 P |
| 3,268,095 | 8/1966 | Durbin | 214/2.5 |
| 3,792,783 | 2/1974 | Brown | 214/2.5 |

*Primary Examiner*—Trygve M. Blix
*Assistant Examiner*—Stuart M. Goldstein

[57] ABSTRACT

A wheeled cart travels on rails between a pipeline moving path and a pipe supply path. The cart is provided with a liftable upper housing having a plurality of pipe holding saddles thereon. Stationary pipe supports having a plurality of corresponding saddles are located adjacent the cart. A hydraulic cylinder reciprocates the cart such that one end of the cart can be brought beneath a pipe or double pipe section at the pipe supply path, and upon extension of the cylinder, the saddle at the opposite end of the cart can be positioned beneath the pipeline moving path. By alternately raising and lowering the upper housing and reciprocating the cart, multiple pipes are stepped from the pipe supply path to the pipeline moving path. The saddle on the cart at the pipeline moving path can be lowered independently of the upper housing for locating a pipe in axial alignment with the pipeline in the pipeline moving path, and, preferably, this saddle is provided with spinning rollers for rotationally aligning the pipe with the pipeline. Another embodiment illustrates moving the cart beyond the pipeline moving path for unloading pipe in the opposite side of the pipeline moving path. Still another embodiment illustrates increasing the movement of the cart such that the next to the last saddle at the pipe supply end of the cart can be positioned beneath the pipe in the pipe supply path to more rapidly make up voids in the cart.

14 Claims, 10 Drawing Figures

MULTI-STAGE PIPE FEEDER

BACKGROUND OF THE INVENTION

1. Field of the Invention

This invention pertains to pipe feeding systems of the type used to deliver single forty-foot lengths of pipe or multiple, welded together forty-foot lengths of pipe to the pipeline moving path, called the "firing line," aboard a pipeline laying vessel.

2. Description of the Prior Art

Various systems have been used on decks heretofore for transporting pipe or multiple, welded together lengths of pipe from a pipe supply conveyor, usually positioned along the outside of the deck, and the completed pipeline, which generally moves in a fore and aft path along the center of the deck. A difficulty in handling this pipe is caused by the fact that the diameter of vessel laid pipeline is getting increasingly larger, for example, in some cases up to 72 inches, and requires higher strength apparatus for carrying the loads. The difficulty is aggravated when the pipe laying vessel is rolling in heavy seas, and thus the heavy cylindrical pipe is subjected to forces trying to make them roll. The cost of operating a pipeline laying vessel amounts to many thousands of dollars per day. It thus becomes extremely important that the equipment handling the pipe be capable of withstanding both the forces acting on the pipe and the corrosive marine environment so that downtime for maintenance or repair is minimized.

None of the prior art devices meets all of these requirements satisfactorily. One prior art device employs a set of roller chains for carrying multiple sections of pipe from a pipe supply conveyor to the firing line. At each end of the conveyor, an accessory feeding device is required to transport the pipe from the supply conveyor to the chains and thence from the chains to the firing line. Still another device uses a walking beam in which a movable beam having a plurality of pipe holding saddles is lifted and then pivoted, carrying the pipe toward the firing line. The beam is then lowered, resting the pipe on a stationary set of supports while it pivots back a distance equal to one saddle and repeats the process. Both of these prior art systems are expensive to build and maintain and are subject to frequent breakdown due to the stresses on the devices.

Another prior art type of feeding mechanism is a reciprocable mobile cart having a single saddle. The cart rides on rails alongside a stationary set of pipe supports, each having a plurality of saddles. This type of cart is very time-consuming to operate since it must pick up a pipe at the supply conveyor and move it to the first saddle on the stationary supports. It must then go to the end of the stationary supports and unload a pipe into the firing line. Then it must come back to the stationary supports and, through short reciprocating movements, individually lift each pipe and advance it one saddle along the stationary supports. This is particularly time-consuming when the temporary lack of pipe from the supply causes a "void" or empty saddle in the feeding mechanism, which results in additional trips by the cart to catch up or fill all of the saddles to assure a constant supply of pipe to the pipeline moving path.

SUMMARY OF THE INVENTION

It is an object of this invention to provide a pipe feeding apparatus for a pipeline laying vessel which is simpler in construction and faster and less expensive than prior art feeding apparatus.

It is another object of this invention to provide a pipe feeding apparatus which safely transports the pipe during rough seas.

It is still another object of the invention to feed pipe to the firing line of a pipe laying vessel quickly and with a minimum amount of downtime for maintenance or repair.

Basically, these objects are obtained by providing a movable, wheeled pipe carrying means having a plurality of pipe holding devices or saddles for simultaneously carrying a plurality of pipes or welded together pipe sections between the pipe supply and the pipeline moving path on the vessel. The pipe or pipe sections are advanced simultaneously by lifting the pipe off stationary pipe carrying means and then lowering the pipe after advancement back to the stationary pipe carrying means, followed by retraction of the movable, wheeled pipe carrying means one step to repeat the cycle. In the preferred embodiment, the movable pipe carrying means is provided with an upper housing that can be raised to lift the pipe off the saddles of the stationary pipe carrying means. An alternative embodiment provides for additional advancement of the movable pipe carrying means to go beyond the pipeline moving path for handling pipe on the opposite side of the pipeline moving path. Still another embodiment provides for increasing the length of movement of the movable, wheeled pipe carrying means so that the next to the last pipe holding device or saddle can be positioned beneath the pipe supply conveyor for more quickly making up voids in the pipe feeding apparatus.

As is readily apparent, a wheeled pipe carrying means reciprocable between the pipe supply and the firing line enables the pipe, at all times, to be positively held in a set of saddles to thus prevent its rotation or rolling action due to movement of the vessel. Secondly, the wheeled pipe carrying means provides an efficient and low-maintenance rolling movement for handling heavy loads in the hostile marine environment. As a result, downtime for maintenance and repair is substantially minimized. Still further, the multiple saddles on the pipe feeding apparatus allow several pipes or welded together pipe sections to be fed simultaneously, thus increasing the feeding capacity to the pipeline moving path.

BRIEF DESCRIPTION OF THE FIGURES OF THE DRAWING

FIG. 8 illustrates a typical movement of the pipe in the preferred embodiment. FIG. 9 illustrates movement of the pipe in a modification with an extended stroke for filling a next to the last set of saddles directly from the pipe supply conveyor.

DETAILED DESCRIPTION OF THE EMBODIMENTS OF THE INVENTION

Figure 1:
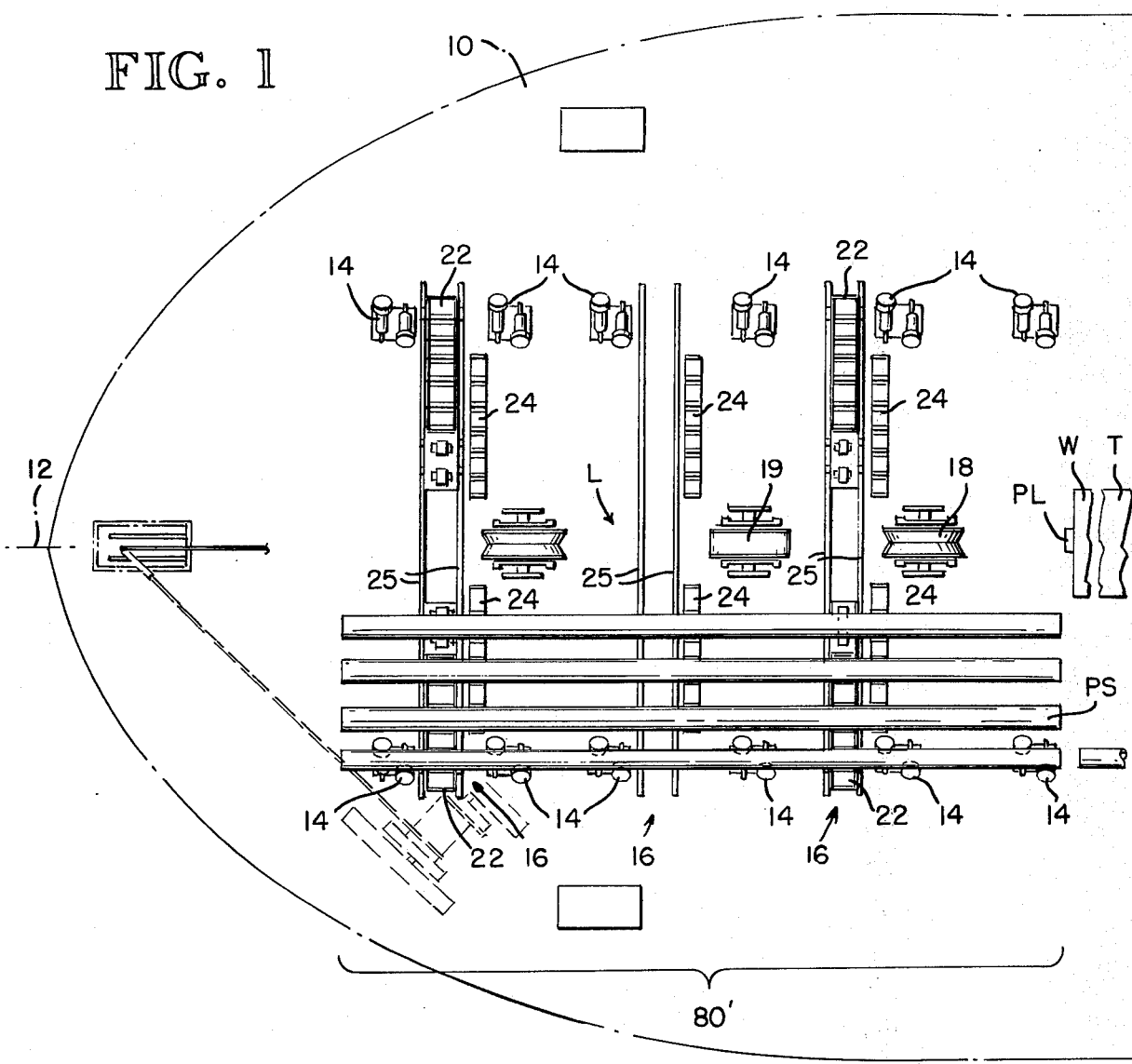
FIG. 1 is a schematic plan of the bow section of the deck of a pipeline laying vessel illustrating the principles of the invention.
Figure 2:
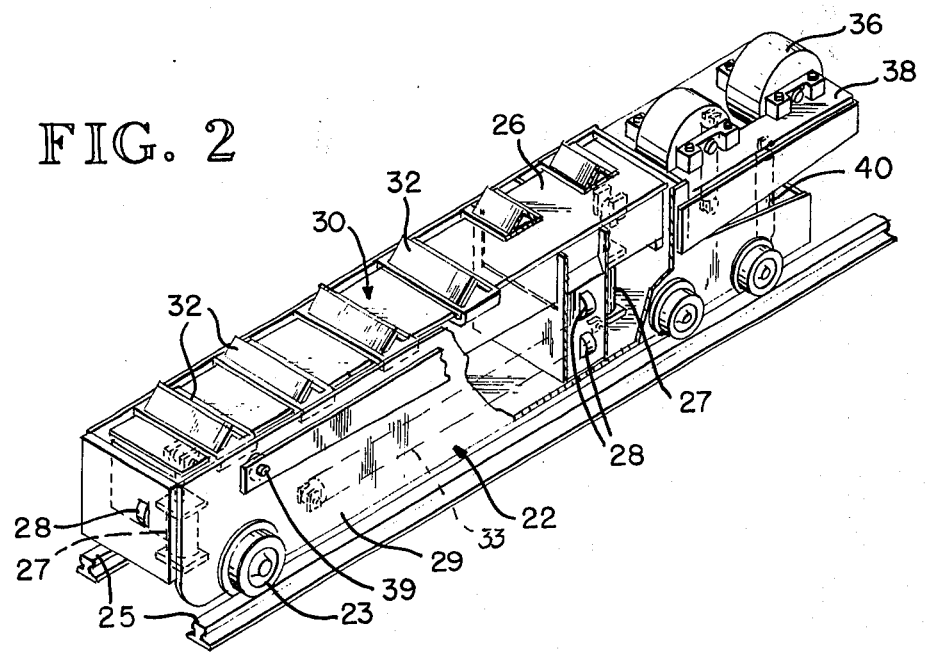
FIG. 2 is a fragmentary isometric, with parts broken away for clarity, of the improved pipe feeding apparatus of this invention.

As best illustrated in FIG. 1, a vessel 10 is provided with a pipeline PL lying in a fore and aft pipeline moving path 12. The pipeline moving path 12 is commonly referred to as the "firing line."

Laterally offset from the firing line is a pipe supply conveyor 14. The conveyor 14 is conventional in construction and carries either single pipe of 40-foot lengths, for example, or, as in the preferred embodiment illustrated, carries welded together eighty-foot sections of pipe PS. Pipe feeding apparatus 16 of this invention are provided to transport the pipe sections from this conveyor to the firing line. 80-foot 40-foot In the firing line, there are provided one or more pipe tensioners T, a pipe welding station W and a pipe lineup station L. At the pipe lineup station, conventional powered rollers 18 position and hold the pipe against the end of the pipeline in the welding station. The rollers 18 also are powered to move vertically and horizontally to maintain a desired axial alignment of the pipe being welded to the pipeline during movement of the pipeline by the pipe tensioner. A conventional idler roller 19 is located between the powered rollers 18. The idler roller 19 is used only when handling eighty-foot double lengths of pipe for intermediate support during a barge move-ahead operation. When handling forty-foot lengths of pipe, the idler roller is removed and replaced by a powered roller 18. Also at the lineup station, the pipe is rotated about its longitudinal axis to make the best mating contact between the pipe and the end of the pipeline and to keep the seam of the pipe offset from the seam of the last pipe in the pipeline. The rotational movement of the pipe sections can be provided by spinning rollers of a conventional design incorporated into the rollers 18; however, in the preferred embodiment, the spinning is accomplished by powered spinning rollers on the pipe feeding apparatus of this invention.

The pipe feeding apparatus 16 is best illustrated in FIGS. 2–7 and includes a movable cart 22 having a plurality of wheels 23 which ride on a set of rails 25. The rails are positioned alongside stationary pipe supports 24. As best illustrated in FIG. 1, two carts 22 are provided with three stationary pipe supports 24. The carts and stationary pipe supports are identical, such that only one of each will be described. If single length pipe is being handled, the movable cart furthest forward on the deck is repositioned next to the centermost stationary support.

The cart 22 is provided with an upper housing 26 that is liftable upwardly by a plurality of hydraulic cylinders 27. Guide rollers 28 maintain alignment of the upper housing with a base 29 to which the wheels 23 are attached. The upper housing is provided with a plurality of saddles 30, each formed of a pair of triangular seats 32. The upper housing in the preferred embodiment has three saddles to correspond to three identical saddles on each of the stationary supports 24.

A cylinder 33 on the cart has a piston rod pinned to the deck for reciprocating the cart along the rolls 25.

Figure 4:
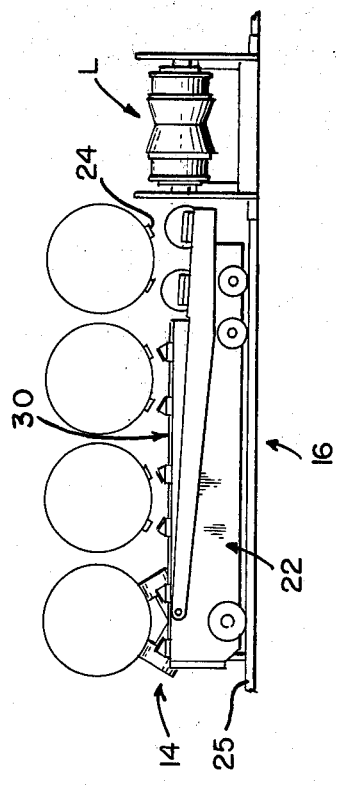
Figure 6:
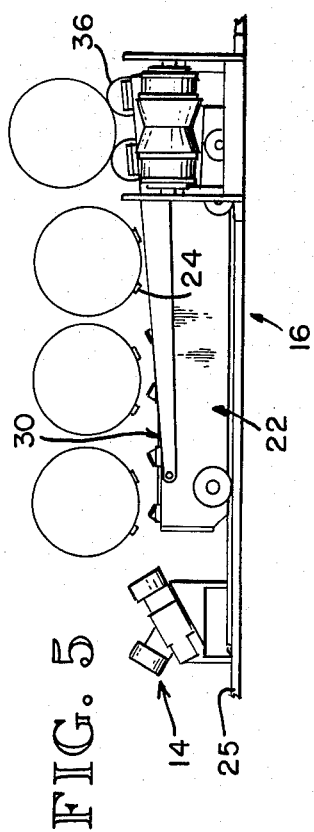
Figure 7:
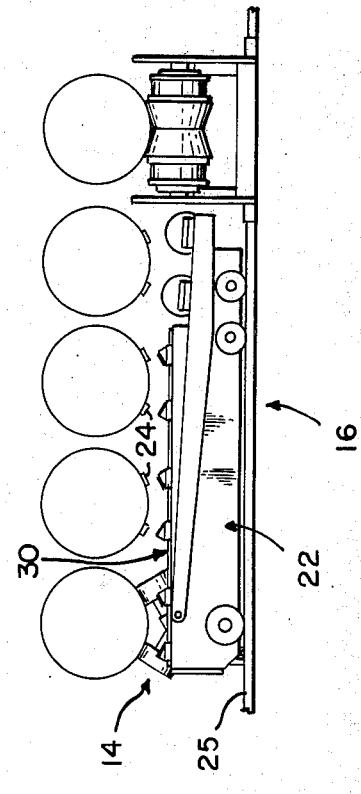

At the end of the cart adjacent the lineup station L, an independently movable saddle mechanism is provided. This saddle mechanism, however, rather than having triangular seats 32, is provided with a pair of spinning rollers 36 which are powered to spin the pipe in the lineup station. The spinning rollers are mounted on a carriage 38 which is pivoted about a pin 39 by a set of hydraulic cylinders 40. Thus, as best shown in FIGS. 4 and 6, the rollers can be raised and lowered independently of the upper housing 26. When the cart is retracted to pick up pipe at the supply conveyor 14 and advance it along the stationary supports 24, the powered spin rollers act as any of the other saddles; but when the cart is advanced toward the pipeline, the powered spinning rollers are free to move independently of the other saddles to position the pipe section in the lineup station.

Figure 3:
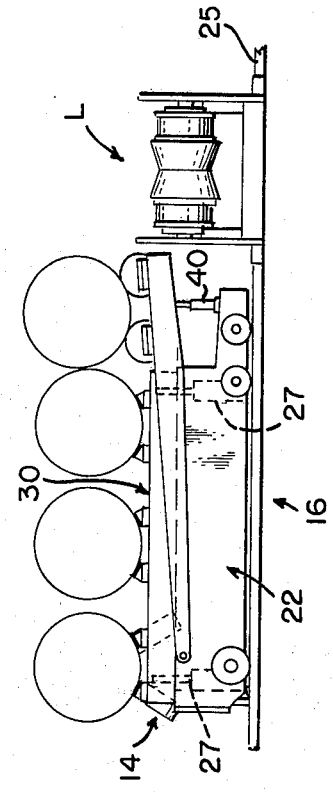
FIGS. 3–7 illustrate an operational sequence for feeding pipe using the principles of this invention.
Figure 5:
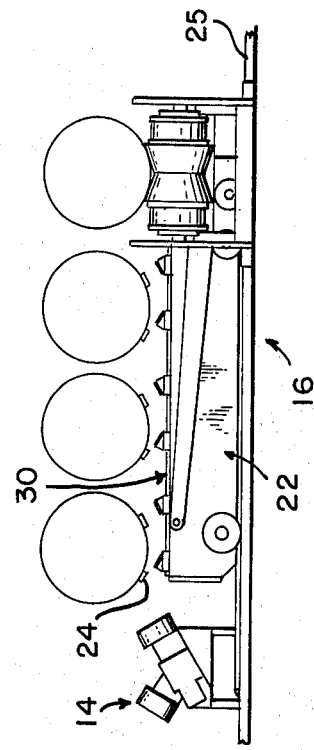

Operation of the pipe feeding apparatus is best illustrated in FIGS. 3–7. In FIG. 3, three pipes are supported on the stationary pipe supports 24, while the end saddle is positioned beneath the pipe supply conveyor 14. In FIG. 4, the upper housing 26 has been elevated to lift the pipe sections off the stationary pipe support 24 and the pipe supply conveyor. Next, in FIG. 5, the upper housing is retracted, leaving three of the pipes on the stationary pipe supports 24, with the forwardmost pipe being positioned in the lineup station by the powered spinning rollers 36. At this point, the rollers orient the seam and match ovality of the pipe. In FIG. 6, the powered spinning rollers are lowered to place the pipe in the rollers 18 of the lineup station. Finally, in FIG. 7, the cart is retracted such that the end saddle is again positioned beneath the supply conveyor which now has received a new section of pipe.

Figure 8:
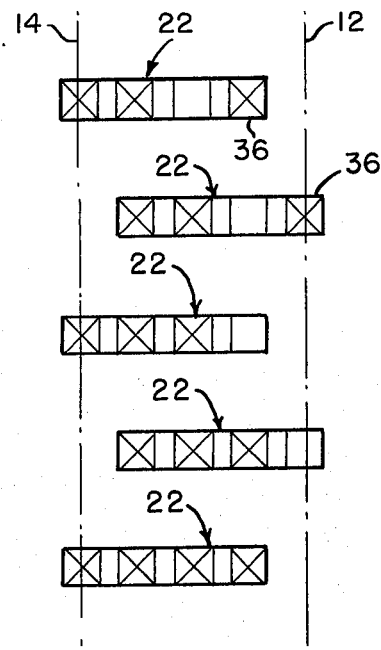
FIGS. 8–9 are schematic operational diagrams illustrating the movement of pipe on various embodiments of the pipe feeding apparatus.
Figure 10:
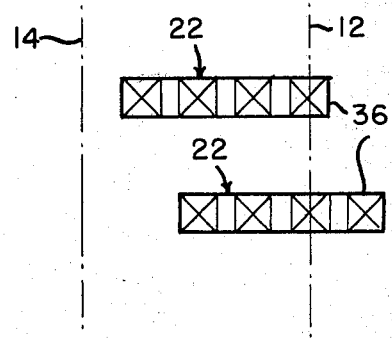
FIG. 10 illustrates another embodiment in which the pipe feeding apparatus can be extended beyond the pipeline moving path for loading or unloading pipe on the opposite side of the pipeline.
Figure 9:
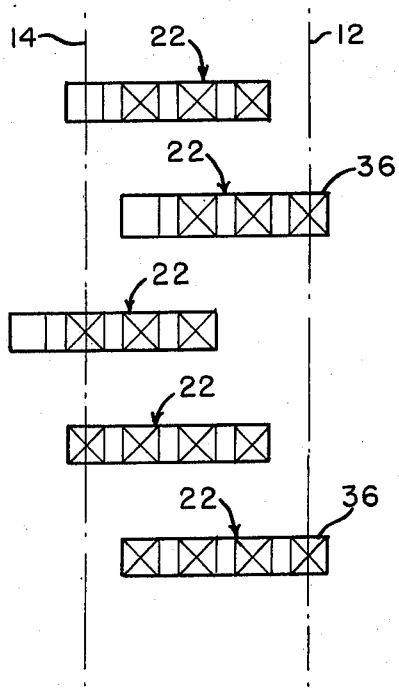

FIGS. 8 through 10 show the enhanced versatility of the apparatus of this invention in removing voids or in performing additional pipe handling functions. The optimum utilization of a pipe laying vessel requires that pipe be added to the pipeline as often as every three minutes. If, for some reason, a pipe does not arrive in the pipe supply conveyor and a pipe must be fed into the lineup station, a void is created at the saddle of the stationary pipe supports adjacent the pipe supply. It is desirable to eliminate this void as soon as possible so that a pipe will always be available at the spinning roller end of the cart to place a pipe into the lineup station on demand. In normal operation, illustrated in FIG. 8, the cart will be able to recycle in less than every 3 minutes so that voids can generally be readily made up at the spin roller or last station. That is, during the welding interval, the cart can retract back and forth to pick up a new pipe, advancing all three pipes simultaneously and carrying the void at the next to last saddle forward through the stationary pipe supports. When the void reaches the spin roller station, the cart is merely recycled to fill up the spin rollers.

FIG. 9 illustrates an alternative embodiment in which the next to the last saddle toward the pipe supply can be positioned beneath the pipe supply conveyor 14. In this manner, a void can be made up at the inlet end of the cart rather than at the discharge end. That is, the void is created at the inlet saddle, next a pipe is delivered to the lineup station, next the remaining two pipes are picked up from the stationary supports and carried back so that the next to the last empty saddle is placed beneath the supply conveyor and filled. Then the cart is advanced one saddle length; the supply conveyor is immediately filled and the last saddle is then filled from the replenished pipe supply. Finally, the cart is advanced to again place a pipe in the lineup station.

FIG. 10 illustrates still another embodiment in which the cart can be reciprocated such that the power rollers extend beyond the pipeline movng path. This operation can be utilized, for example, in situations in which a defective piece of pipe is discovered during the welding operation. The defective pipe must be removed from the pipeline immediately, and rather than have to go through a complete revere cycling of the entire operation, the powered spinning rollers 36 can come into position, pick up the pipe and move it out onto the opposite side of the pipeline where it can be disposed of. In a second situation, if the second pipe feeding apparatus on the starboard side of the vessel becomes temporarily out of operation, the spin rollers 36 of the port side pipe feeding apparatus can be temporarily employed to bring a pipe from the starboard side into the lineup station.

While the preferred embodiments of the invention have been illustrated and described, it should be understood that they are capable of modification while still remaining within the principles described herein. Accordingly, the invention is not to be limited to the specific embodiments illustrated.

The embodiments of the invention in which a particular property or privilege is claimed are defined as follows:

1. Pipe feeding apparatus for a pipe laying vessel having a pipe supplying station and, laterally spaced therefrom, pipeline tensioning means, pipeline welding means and a pipe lineup station aligned fore and aft on the vessel along a pipeline moving path, the improvement comprising:
   movable, wheeled pipe carrying means having a plurality of first pipe holding devices spaced along a path laterally extending from the pipe lineup station in said pipeline moving path to said pipe supplying station,
   stationary pipe carrying means having a plurality of second pipe holding devices spaced along said laterally extending path,
   means for reciprocating said movable, wheeled pipe carrying means between said pipe supplying station and said pipe lineup station for transporting pipe along said laterally extending path, and
   means for alternately transferring said pipe between said second pipe holding devices and said first pipe holding devices for moving the pipe along said laterally extending path during reciprocatory movement of said movable, wheeled pipe carrying means whereby multiple pipes can be advanced simultaneously along said laterally extending path.

2. The pipe feeding apparatus of claim 1, including means for lowering the last pipe holding device of said wheeled pipe carrying means adjacent the pipeline moving path independently of the remaining pipe holding devices for positioning the pipe in the lineup station.

3. The pipe feeding apparatus of claim 2, said last pipe holding device adjacent said pipe delivery station including powered spinning means for rotating the pipe about its longitudinal axis to rotationally align the pipe with the pipeline in the welding station.

4. The pipe feeding apparatus of claim 1, said movable, wheeled pipe carrying means including a base and an upper housing carrying said first pipe holding devices, said means for alternately transferring the pipe between said first and second pipe holding devices including powered extensible means on said base for vertically reciprocating said upper housing above said second pipe holding devices of said stationary pipe carrying means.

5. The pipe feeding apparatus of claim 1, said means for reciprocating said movable, wheeled pipe carrying means along said laterally extending path including rails mounted along the laterally extending path, said movable, wheeled pipe carrying means riding on said rails, and powered extensible means for reciprocating the movable, wheeled pipe carrying means along said rails.

6. The pipe feeding apparatus of claim 1, said means for reciprocating said movable, wheeled pipe carrying means being operable for moving at least two pipe holding devices spaced along said laterally extending path of the wheeled pipe carrying means beyond the pipe supply station for filling voids in the pipe holding devices.

7. The pipe feeding apparatus of claim 2, said means for reciprocating said movable, wheeled pipe carrying means being operable for moving said last pipe holding device adjacent the pipeline moving path beyond said pipeline moving path for unloading or loading pipe from the opposite side of said pipeline moving path.

8. The pipe feeding apparatus of claim 1, said movable, wheeled pipe carrying means including at least two carts spaced along said pipeline moving path, with a stationary pipe carrying means alongside each movable wheeled pipe carrying means whereby the apparatus is suitable for transporting double-standard pipe lengths welded together.

9. The apparatus of claim 1 wherein at least four pipe holding devices are provided on the movable, wheeled pipe carrying means for simultaneously feeding four pipes.

10. The apparatus of claim 8 wherein at least four pipe holding devices are provided on the movable, wheeled pipe carrying means for simultaneously feeding four pipes.

11. Apparatus for carrying pipe between a pipe supply and a pipeline forming path, comprising:
    at least two wheeled carts movable between said pipe supply and said path and each having an upwardly movable housing,
    means for reciprocating said carts,
    at least two stationary pipe holding supports alongside said carts,
    a plurality of pipe holding saddles on said pipe holding supports and each said housing, hydraulic cylinders for raising said saddles on each said housing above the saddles on said pipe holding supports whereby pipe can be lifted clear of said pipe holding supports while the wheeled carts are moved toward said pipeline forming path, and
    means at an end of each said cart adjacent said path for lifting the pipe into said pipeline forming path.

12. The apparatus of claim 11, said means for reciprocating said wheeled carts including hydraulic cylinders, each having a stroke adequate for aligning at least two sets of saddles at said pipe supply for making up voids in said saddles.

13. The apparatus of claim 11, said means for reciprocating said wheeled carts including hydraulic cylinders, each having a stroke adequate to extend said pipe lifting means of said wheeled carts past the pipeline forming path for unloading or loading pipe from the opposite side of said pipeline forming path.

14. The apparatus of claim 11, said pipe lifting means including means for spinning the pipe.

* * * * *